UNITED STATES PATENT OFFICE.

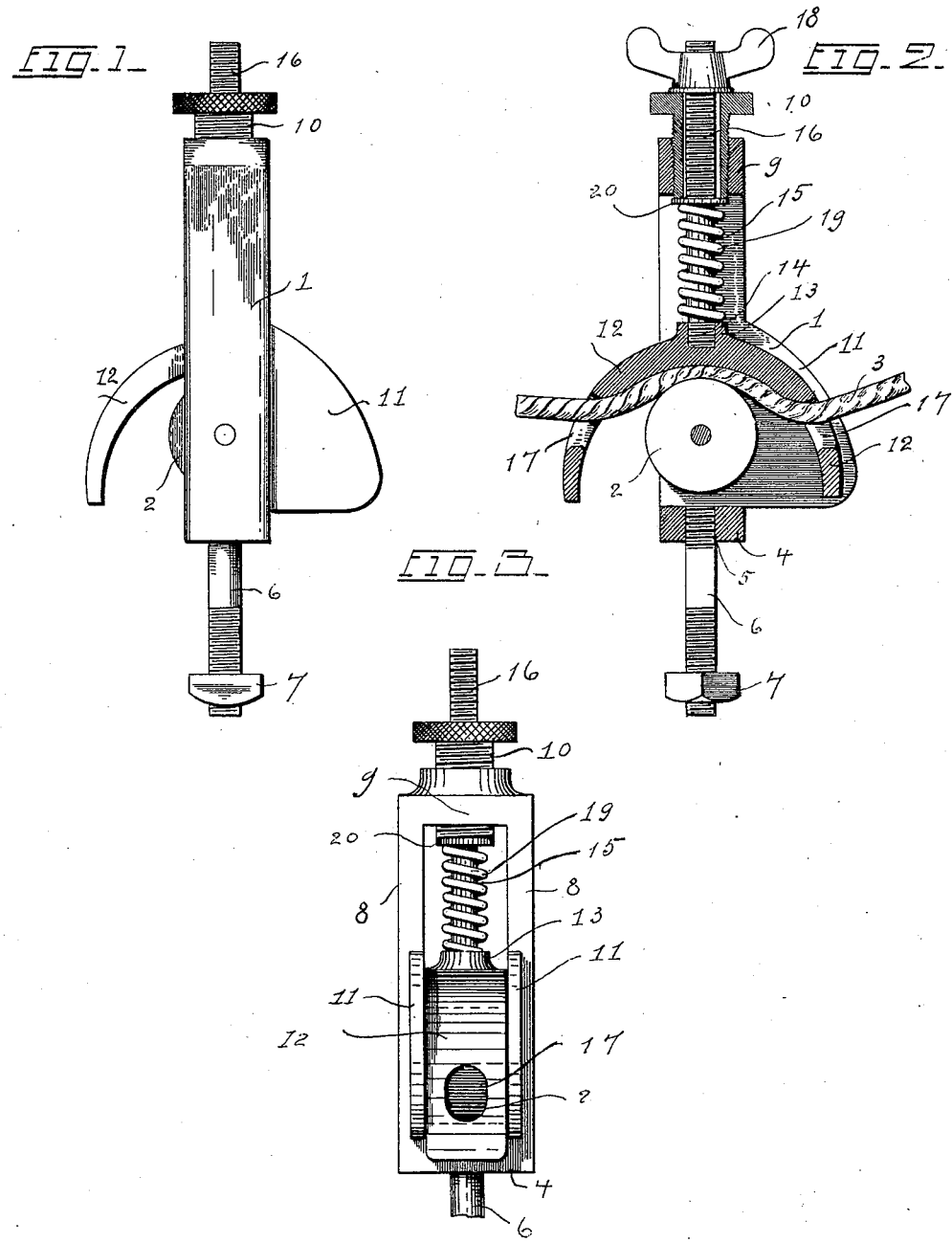

NATHANIEL LEE PRATT, OF BLISSFIELD, MICHIGAN.

TENSION DEVICE FOR GRAIN-BINDERS.

SPECIFICATION forming part of Letters Patent No. 589,222, dated August 31, 1897.

Application filed April 21, 1897. Serial No. 633,124. (No model.)

*To all whom it may concern:*

Be it known that I, NATHANIEL LEE PRATT, of Blissfield, county of Lenawee, and State of Michigan, have invented certain new and useful Improvements in Tension Devices for Grain-Binders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a tension device for grain-binders, and has for its object to provide a simple, inexpensive, and effectual mechanism for attachment intermediate the twine-receptacle and the binding mechanism, whereby there shall be insured an even feed of binding-twine irrespective of the unevenness or knots to be encountered in the passage of the twine to the binding mechanism.

A further object is to provide for lateral swaying of the tension portion of the device, whereby in the passage of the uneven or unequal portions of the twine the impingement shall be the same in the retardation or delivery of the binding-twine.

A further object is to provide for vertical movement of the twine-guide with respect to the coacting antifriction-roller that the guide may be raised to permit of passing the binding-twine through the openings in the guide and over the roller without the expenditure of time and patience heretofore required.

A further object is to provide a fender to receive any kinks, knots, or aggregation of the twine prior to its feed to the roller and subjection to tension.

A further and important object is to provide for a predetermined tension upon the binding-twine with provision for raising the twine-guide for insertion of the twine with a return of the guide to the predetermined adjustment for tension, whereby unskilled workmen may be employed with the best results.

In the drawings, Figure 1 is a side elevation of a complete tension and take-up device. Fig. 2 is a longitudinal vertical section of the same, and Fig. 3 is a front elevation.

1 designates the frame, in which is journaled a roller 2, over which the binding-twine 3 passes. Frame 1 comprises the transverse bottom portion 4, in which is a central screw-threaded orifice 5, into which is screwed one end of a threaded rod 6, having a nut 7 upon the lower end, whereby the frame may be securely attached to the harvester in proper location to receive the binding-twine in its passage to the knotting mechanism. The frame also comprises two vertical standards 8 and a transverse connecting centrally-perforated top portion 9, with the perforation internally screw-threaded to receive a tubular externally screw-threaded tension-nut 10, the front side of the standards having winged fenders 11 projecting therefrom for a purpose to be hereinafter stated.

12 designates the twine-guide, semicircular in cross-section upon its under face, with the radius of the circle of greater area than that of the circumference of roller 2, whereby the guide may be allowed a lateral swaying movement, and at the same time have a bearing upon the roller at all times. The upper face of the guide 12 is reinforced at 13 by an internally-screw-threaded perforated base to receive the lower screw-threaded end 14 of a suspension-rod 15, of which the upper end 16 plays freely through the tension-nut 10 with sufficient room to allow of lateral sway to compensate for unevenness and inequalities in the binding-twine, whereby an enlarged portion of the twine will be allowed to pass between the roller and guide and at the same time the compensatory separation of the guide from the roller at one point will tend to rock the guide for impingement to the proper degree of a portion of twine of normal size, thereby avoiding the difficulty heretofore experienced of too free feed of twine under these circumstances and consequent imperfect operation of the knotter mechanism due to slackness of twine.

Guide 12 is formed with two perforations 17, through which the twine is passed, and to render the operation of passing the twine through the perforations and over the roller 2 convenient there is a thumb-nut 18 run upon the upper end 16 of suspension-rod 15, whereby the twine-guide may be raised to a degree to cause perforations 17 to be in horizontal alinement with the upper face of the roller 2 and slightly above the roller, so that the twine may be unobstructedly passed through the perforation.

The twine-guide is adjusted as to its pressure upon the twine-roller 2 by means of a spiral spring 19, bearing at its lower end upon base 13 and at its upper end upon a centrally-perforated disk 20 upon suspension-rod 15 and free to play thereon, with which the lower annular end of tension-nut 10 contacts, and by which means the proper compression or relaxation of spring 19 may be afforded, and consequently the frictional resistance of the twine-guide with the twine. After the twine has been passed through the orifices in the guides the nut 18 is removed and placed in the tool-box to prevent unauthorized persons or ignorant help from tampering with the previously-adjusted tension of the twine-guide.

In order to avoid the possibility of snarled portions of twine becoming entangled with the forward end of the guide, as has heretofore frequently occured, I form standards 8 with winged fenders 11 of greater area than the exterior contour of the front side of the twine-guide, whereby the snarl may be initially resisted by contact with the wings and properly straightened out to pass through the guide.

What I claim is—

1. In a tension device for grain-binders, a frame, a roller journaled therein, a twine-guide having a frictional surface in coincidence with the roller, and a suspension-rod secured therein provided with a screw-threaded upper end, a tension-spring upon the rod, a tubular externally-threaded nut run into the frame and bearing upon the upper end of the spring, a nut upon the upper end of the suspension-rod, whereby the guide may be raised to allow of inserting the twine through holes formed in the ends of the twine-guide and over the roller, the internal diameter of the tubular nut allowing lateral sway to the rod passed therethrough to allow a rocking motion of the twine-guide with respect to the roller, to compensate for unevenness of the twine.

2. In a tension device for grain-binders, a frame for attachment to the binder, formed with forwardly-projecting wings or fenders, a roller journaled in the frame, a twine-guide formed with a semicircular lower face, secured in the frame by a vertical post and a coiled spring thereon, a tubular nut screwed in the frame and bearing upon the spring, and a screw-thread upon the post having a nut thereon for raising the twine-guide to allow of insertion of the twine through a hole formed in each side of the guide.

In testimony that I claim the foregoing as my own I hereby affix my signature in presence of two witnesses.

NATHANIEL LEE PRATT.

Witnesses:
WILLIAM WEBSTER,
MAUD SCHUMACHER.